United States Patent [19]
Kusumoto et al.

[11] Patent Number: 5,609,542
[45] Date of Patent: Mar. 11, 1997

[54] PLANETARY GEAR SPEED REDUCER AND MACHINING METHOD FOR PLANETARY GEAR SUPPORTING PIN FOR THE SAME

[75] Inventors: Keiichi Kusumoto; Keiichi Konishi; Shuzo Isozumi; Akira Morishita, all of Tokyo, Japan

[73] Assignee: Mitsubishi Denki Kabushiki Kaisha, Tokyo, Japan

[21] Appl. No.: 530,927

[22] Filed: Sep. 20, 1995

[30] Foreign Application Priority Data

Aug. 18, 1995 [JP] Japan ..................................... 7-210613

[51] Int. Cl.$^6$ ........................................................ F16H 1/38
[52] U.S. Cl. ................................................................ 475/331
[58] Field of Search ............................................. 475/331

[56] References Cited

U.S. PATENT DOCUMENTS 4,920,812  5/1990  Okamoto et al. ............................. 74/6

FOREIGN PATENT DOCUMENTS

58-77952   5/1983   Japan .
101252   7/1985   Japan .

Primary Examiner—Dirk Wright
Attorney, Agent, or Firm—Sughrue, Mion, Zinn, Macpeak & Seas

[57] ABSTRACT

A planetary gear speed reducer and a machining method for a planetary gear supporting pin which enable the supporting pin to be formed as an integral part of a flange section by forging so as to reduce the number of parts, permit greater ease of assembly, and achieve lower cost and also to make it easier to obtain perpendicularity of the supporting pin with respect to the flange section. A plurality of supporting pins which are formed in hollow cylindrical shapes are pressed out at equal angle pitches on the same circumference on the rear end surface of a flange section which is made integral with an output rotary shaft. The front end surface of the flange section has recessed sections which are formed coaxially with the supporting pins. The outside diameters of the supporting pins are made smaller than the inside diameters of the recessed sections. The distal ends of the supporting pins are open and the hollow sections of the supporting pins are communicated with the recessed sections.

4 Claims, 7 Drawing Sheets

PLANETARY GEAR SPEED REDUCER AND MACHINING METHOD FOR PLANETARY GEAR SUPPORTING PIN FOR THE SAME

BACKGROUND OF THE INVENTION

1. Field of the Invention

The present invention relates to a planetary gear speed reducer employed for an internal combustion engine starter or the like.

2. Description of the Related Art

Figure 8:
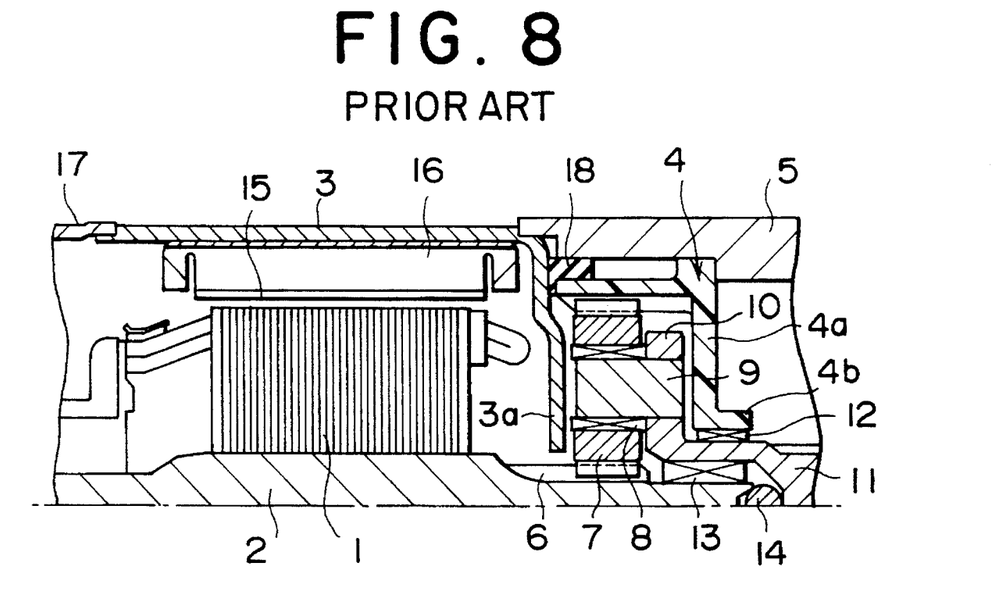
FIG. 8 is a cross-sectional view illustrative of a conventional planetary gear speed reduction starter employing a permanent magnet for a motor.
Figure 9:
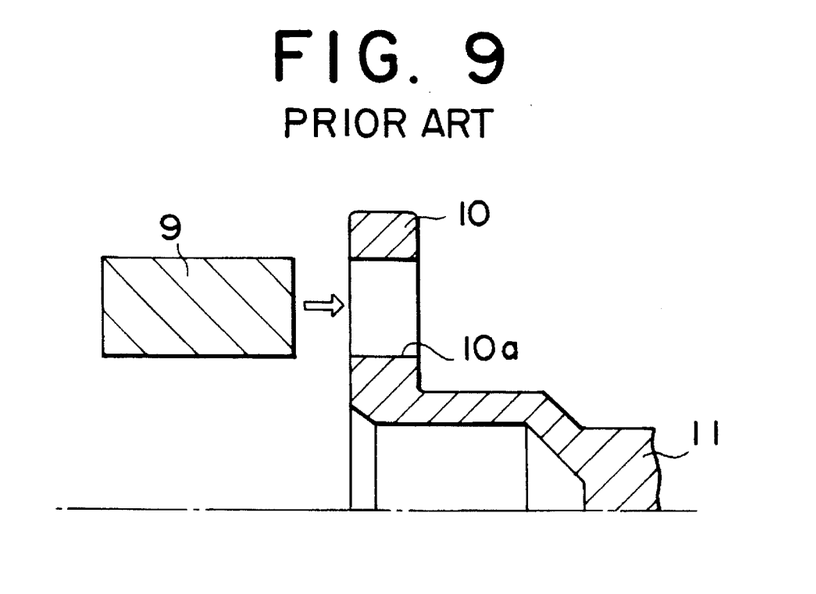
FIG. 9 is a cross-sectional view illustrative of the mounting process of the planetary gear supporting pin in the conventional planetary gear speed reduction starter.

FIG. 8 is a cross-sectional view illustrative of a planetary gear speed reduction starter which employs a permanent magnet as a conventional motor; and FIG. 9 is a cross-sectional view illustrative of a method for mounting a planetary gear supporting pin in a conventional planetary gear speed reduction starter.

In the drawing, an armature 1 of a DC motor serving as a rotator, is provided around an armature rotary shaft 2 as an integral part of the armature rotary shaft 2. A cylindrical yoke 3 is disposed so that it surrounds the armature 1. A front bracket 5 is connected to the end surface of the yoke 3. An internal gear 4, which constitutes the planetary gear speed reducer, is fitted inside the front bracket 5. A sun gear 6 is formed at the front end of the armature rotary shaft 2.

At the front end of the internal gear 4, a discshaped flange 4a is provided, jutting out inward; a cylindrical flange 4b is provided, jutting out to the front at the inner peripheral end of the flange 4a. A flange section 10 constructing an arm of the planetary gear speed reducer is constituted as an integral part of an output rotary shaft 11. The output rotary shaft 11 is supported by a sleeve bearing 12 serving as a bearing fitted to the flange 4b. The flange 4a restricts the thrusting movement of the output rotary shaft 11. Provided on the flange section 10 are, for example, three supporting pins 9 which are arranged at equal angle pitches on the same circumference. A planetary gear 7 is supported by a pin 9 via a bearing 8 fitted to the inner peripheral surface. In this case, each planetary gear 7 meshes with the sun gear 6 and the internal gear 4 to construct the planetary gear speed reducer.

A sleeve bearing 13 serving as a bearing is fitted in the recessed section in the rear inner peripheral surface of the output rotary shaft 11; the sleeve bearing 13 supports the front end of the armature rotary shaft 2. A steel ball 14 serving to transfer thrust load is fitted between an end of the armature rotary shaft 2 and an end of the output rotary shaft 11.

The yoke 3 has, at the front end thereof, a collar 3a which is made integral with the yoke 3 and which extends in the radial direction. The collar 3a restricts the thrusting movement of the planetary gears 7 and isolate the speed reducer and the motor unit from each other for dustproof effect. A gasket 18 is fitted between the front bracket 5, the internal gear 4, and the collar 3a to prevent the leakage of the grease applied to the meshing areas of the planetary gears 7 and the internal gear 4. A rear bracket 17 is fitted to the end surface of the opening of the yoke 3.

A plurality of auxiliary electrodes (not shown) are welded at equal angle pitches to the inner peripheral surface of the yoke 3. A plurality of arc permanent magnets 15 are disposed in such a manner that they surround the armature 1; one side surface of each permanent magnet 15 is in contact with an auxiliary electrode and a magnet holder 16 is press-fitted between the other side surface of the permanent magnet 15 and an adjoining auxiliary electrode.

There are provided as many permanent magnets 15 and auxiliary electrodes as the electrodes of the motor.

The flange section 10 formed as the integral part of the output rotary shaft 11 is furnished with a plurality of through holes 10a at equal angle pitches on the same circumference. The supporting pins 9 are machined into solid cylindrical shapes having an outside diameter which is slightly larger than the diameter of the through holes 10a. Thus, the supporting pins 9 are mounted on the flange section 10 by press-fitting them in the through holes 10a.

The operation of the conventional planetary gear speed reduction starter stated above will now be described.

Closing a key switch (not shown) energizes the armature 1 to cause the armature to produce a torque under the magnetic energization of the permanent magnet 15. The torque generated by the armature 1 is transmitted to the planetary gears 7 via the sun gear 6 of the armature rotary shaft 2. Since the planetary gears 7 are engaged with the internal gear 4, they revolve around the armature rotary shaft 2 while turning around the supporting pin 9. The torque of the armature 1 is therefore reduced in rotational speed before it is transmitted to the flange section 10 and further transmitted to the output rotary shaft 11 via the flange section 10. The torque of the output rotary shaft 11 is transmitted to a ring gear (not shown) of an internal combustion engine via a pinion (not shown) of an overrunning clutch which is fitted thereto.

As described above, the conventional planetary gear speed reducer has a problem in that the supporting pins 9 which support the planetary gears 7 are constructed separately from the flange section 10 of the output rotary shaft 11, resulting in more parts, difficulty in assembling, and higher cost.

Furthermore, the supporting pins 9 press-fitted in the through holes 10a in the flange section 10 make it difficult to vertically install the supporting pins 9 with respect to the end surface of the flange section 10, adversely affecting the engagement of the planetary gears 9 with the sun gear 6 and the internal gear 4.

SUMMARY OF THE INVENTION

The present invention has been made with a view toward solving the problems stated above and it is an object of the present invention to provide a planetary gear speed reducer and a machining method for a planetary. gear supporting pin which enable the supporting pin to be formed as an integral part of a flange section by forging so as to reduce the number of parts, and achieve greater ease of assembly and lower cost and also to make it easier to secure perpendicularity of the supporting pins with respect to the flange.

In order to achieve the above object, according to one aspect of the present invention, there is provided a planetary gear speed reducer comprising: an internal gear; an output rotary shaft which has a flange section formed as an integral part thereof at the rear end and which is supported by a bearing fitted to the internal periphery of a flange of the internal gear; a rotary shaft which is supported by a bearing fitted in a recessed section of the rear internal peripheral surface of the output rotary shaft; a plurality of supporting pins provided at equal angle pitches on the same circumference on the rear end surface of the flange section; and a plurality of planetary gears which are rotatably mounted on the plurality of supporting pins in such a manner that they engage with the internal gear and a sun gear formed at the front end of the rotary shaft; wherein the supporting pins are pressed out in hollow cylindrical shapes at the rear end surface of the flange section, and the front end surface of the flange section is provided with a recessed section which has an inside diameter larger than the outside diameters of the supporting pins and which is coaxially formed with the supporting pins.

According to another aspect of the present invention, there is provided a machining method for a planetary gear supporting pin, comprising: a step for forming a recessed section in the front end surface of a flange section by applying pressure from the front end surface toward the rear end surface of the flange section which has been made as an integral part of an output rotary shaft by a first punch and also for forming a solid cylindrical section, which has a smaller outside diameter than the inside diameter of the recessed section, coaxially with the recessed section in the rear end surface of the flange section; and a step for applying pressure to the solid cylindrical section from the front end surface toward the rear end surface of the flange section or from the rear end surface to the front end surface by a second punch which has a smaller outside diameter than the outside diameter of the solid cylindrical section, thereby pressing a hollow cylindrical supporting pin out on the rear end surface of the flange section so that it is coaxial with the recessed section.

According to further aspect of the present invention, there is provided a manufacturing method for a planetary gear supporting pin, wherein a punch which has a solid cylindrical section of a large diameter and a solid cylindrical section of a small diameter that has been coaxially provided at the distal end of the solid cylindrical section of the large diameter is used to apply pressure from the front end surface toward the rear end surface of a flange section which has been formed integrally with an output rotary shaft so as to form a recessed section having a large inside diameter in the front end surface of the flange section and also to press out a hollow cylindrical supporting pin, which has a smaller outside diameter than the inside diameter of the recessed section, on the rear end surface of the flange section so that it is coaxial with the recessed section.

DETAILED DESCRIPTION OF THE PREFERRED EMBODIMENTS

Figure 1:
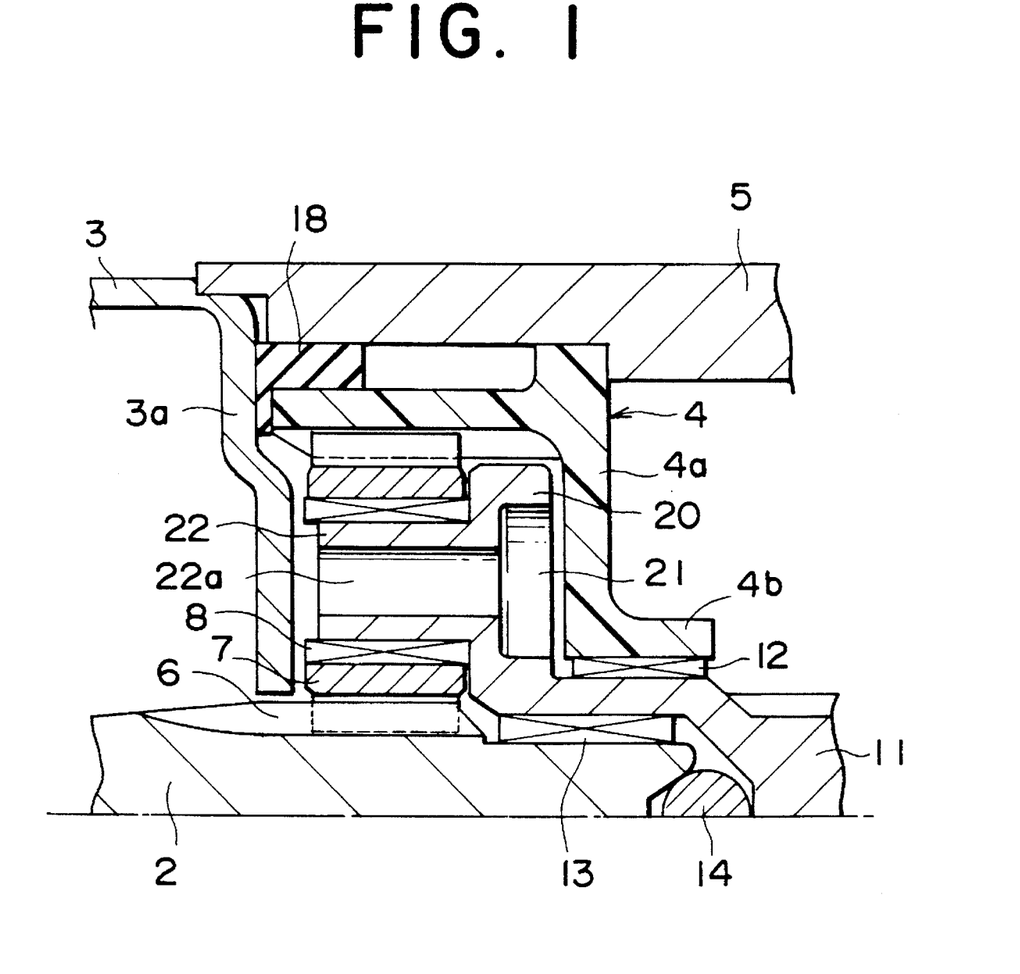
FIG. 1 is a cross-sectional view illustrative of a planetary gear speed reducer and its surroundings of a planetary gear speed reduction motor according to a first embodiment of the present invention.

First Embodiment:

FIG. 1 is the cross-sectional view illustrative of the planetary gear speed reducer and its surroundings of a planetary gear speed reduction motor according to the first embodiment of the present invention. In the drawing, the identical or equivalent components to those of the conventional planetary gear speed reduction starter shown in FIG. 8 are given the same reference numerals and the description thereof will be omitted.

In the drawing, a flange section 20 is made as an integral part of the output rotary shaft 11. The front end surface of the flange section 20 is provided with a plurality of recessed sections 21 at equal angle pitches on the same circumference. The rear end surface of the flange section 20 is provided with supporting pins 22 which are disposed in a hollow cylindrical manner and which are coaxial with the recessed sections 21.

The output rotary shaft 11 is supported by the sleeve bearing 12 fitted to the inner periphery of the flange 4b of the internal gear 4. The armature rotary shaft 2 is supported by the sleeve bearing 73 fitted in the recessed section of the rear inner peripheral surface of the output rotary shaft 11. Further, a plurality of planetary gears 7 are supported by the respective supporting pins 22 so that they mesh with the internal gear 4 and the sun gear 6, which is formed at the front end side of the armature rotary shaft 2, via the bearings 9 fitted to the internal peripheries of the planetary gears 7, thus constituting the planetary gear speed reducer.

The supporting pins 22 have open distal ends, hollow sections 22a being communicated with the recessed sections 21. The outside diameter of the supporting pins 22 is made smaller than the inside diameter of the recessed sections 21.

The rest of the structure is the same as that of the conventional planetary gear speed reduction starter shown in FIG. 8.

The machining method for the planetary gear supporting pins thus constructed will now be described with reference to FIGS. 2A to 2D.

Figures 2A, 2B:
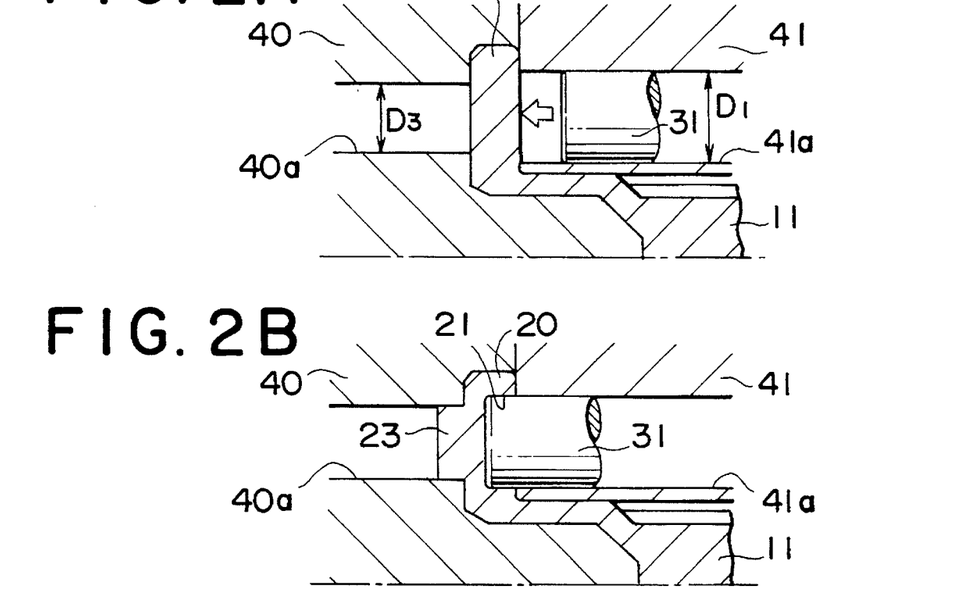
FIGS. 2A to 2B are cross-sectional views illustrative of the steps of the machining process for a planetary gear supporting pin according to the first embodiment of the present invention.

First, a material such as carbon steel and chromium/molybdenum steel is forged to form the output rotary shaft 11 and the flange section 20 into one piece.

The one-piece formed article comprised of the output rotary shaft 11 and the flange section 20 is set on a die 40 and a first punch holder 41. As shown in FIG. 2A, the flange section 20 is pressurized from the front end surface toward the rear end surface thereof by using a first punch 31 inserted in a hollow section 41a of the first punch holder 41 which is positioned coaxially with the hole 40a of the die 40. The material pressurized by the first punch 31 is pushed into the hole 40a of the die 40 and the recessed section 21 is formed in the front end surface of the flange section 20 and a solid cylindrical section 23 is pressed out on the rear end surface of the flange section 20 so that it is coaxial with the recessed section 21.

Figure 2C:
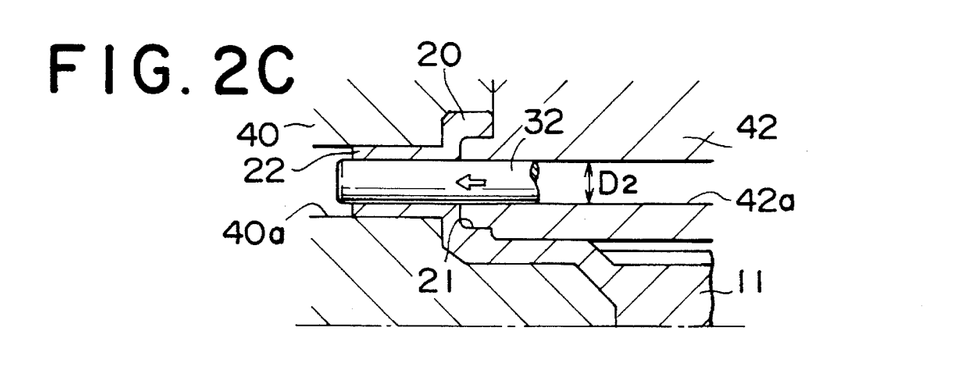
Figure 2D:
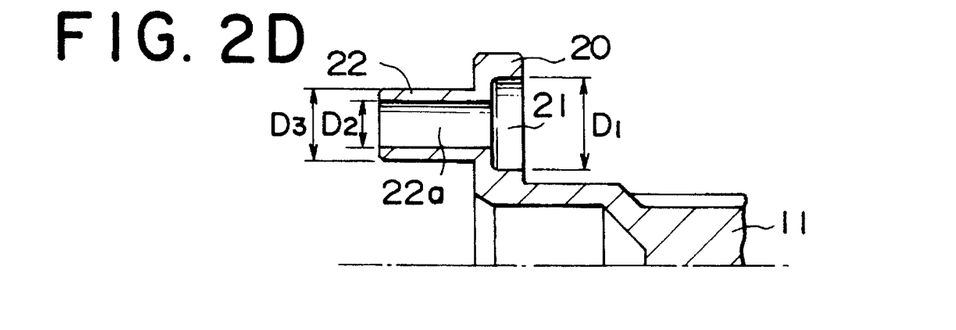

Then, the first punch holder 41 is replaced by a second punch holder 42; the flange section 20 is pressurized from the front end surface toward the rear end surface by a second punch 32 inserted in a hollow section 42a of the second punch holder 42 which is positioned coaxially with the hole 40a of the die 40. The material pressurized by the second punch 32 is pushed into the hole 40a of the die 40. Keeping on pressurizing the second punch 32 causes the distal end of the second punch 32 to jut out of the material as illustrated in FIG. 2C. The second punch 32 is then drawn out, thus forming the hollow cylindrical supporting pin 22 from the rear end surface of the flange section 20 as illustrated in FIG. 2D.

The relationship between the outside diameter (D1) of the first punch 37, the outside diameter (D2) of the second punch 32, and the inside diameter (D3) of the hole 40a of the die 40 is expressed by D1>D3>D2. In this case, the outside diameter of the first punch 31, the outside diameter of the second punch 32, and the inside diameter of the hole 40a respectively correspond to the inside diameter of the recessed section 21, the outside diameter of the supporting pin 22, and the diameter of the hollow section 22a of the supporting pin 22.

A plurality of recessed sections 21 having the inside diameter of D1 are formed at equal angle pitches in the front end surface of the flange section 20, which is made integral with the output rotary shaft 11, on the same circumference. The cylindrical supporting pins 22 having the outside diameter D3 are provided on the rear end surface of the flange section 20 coaxially with the recessed sections 21. The supporting pins 22 have the distal ends thereof open and the hollow sections 22a are communicated with the recessed sections 21.

Thus, according to the first embodiment, the supporting pins 22 are made integral with the flange section 20, enabling a planetary gear speed reducer which makes it possible to decrease the number of parts, achieve greater ease of assembly, and reduce the cost.

Further, since the supporting pins 22 are pressed out from the rear end surface of the flange section 20 by forging, the perpendicularity of the supporting pins 22 in relation to the flange section 20 can be easily secured. This enables a planetary gear speed reducer which is capable of preventing defective engagement of the planetary gear 7 with the internal gear 4 and the sun gear 6.

Furthermore, the inside diameter D1 of the recessed section 21 is made larger than the outside diameter D3 of the supporting pin 22, so that the supporting pin 22 projects high and exhibits good strength. If D1 were equal to D3, then the material located between the outer periphery of the recessed section 21 and the outer periphery of the solid cylindrical section 23 would be susceptible to shear when the flange section 20 is pressurized by the first punch 31, resulting in deteriorated strength of the supporting pin 22. If D1 were smaller than D3, then less material would be pushed out into the hole 40a, resulting in an insufficient height of the supporting pin 22.

Since the supporting pin 22 is machined into hollow cylindrical shape, the material being in the hollow section 22a is pushed out. Therefore, the supporting pin 22 is allowed to have an extra height for the amount of the material being in the hollow section 22a.

Since the distal end of the supporting pin 22 is open, the supporting pin 2 is allowed to have an extra height for the amount of the material at the distal end.

The high projection of the supporting pin 22 permits a larger area of contact between the bearing 8, which is fitted to the inner peripheral surface of the planetary gear 7, and the supporting pin 22. This leads to smaller load per unit applied to the bearing 8, thus achieving a planetary gear speed reducer featuring the bearing 8 which is resistant to wear. Moreover, the tooth width of the planetary gear 7 can be made equal to the projecting height of the supporting pin 22; therefore, the tooth width can be increased, thus achieving a planetary gear speed reducer with the planetary gear 7 featuring enhanced strength.

In addition, pressure is applied to the flange section 20, which is made as an integral part of the output rotary shaft 11, by using the first punch 31 from the front end surface toward the rear end surface thereof so as to form the recessed section 21 at the front end surface of the flange section 20. The solid cylindrical section 23 having a smaller outside diameter than the inside diameter of the recessed section 21 is then pressed out on the rear end surface of the flange section 20 coaxially with the recessed section 21, and the solid cylindrical section 23 is pressurized from the front end surface toward the rear end surface of the flange section 20 by the second punch 32, the outside diameter of which is smaller than the outside diameter of the solid cylindrical section 23. This presses out and forms the hollow cylindrical supporting pin 22 at the rear end surface of the flange section 20 so that it is coaxial with the recessed section 21; therefore, the supporting pin 22 with the high projection can be easily formed into an integral part of the flange section 20 while securing the perpendicularity thereof with respect to the flange section 20.

Second Embodiment:

In the first embodiment described above, the supporting pin 22 is formed by the two steps; one for pressurizing and extruding by the first punch 31 and the other for pressurizing and extruding by the second punch 32. In the second embodiment, the supporting pin 22 is formed by a step for pressurizing and extruding by a punch which has a solid cylindrical section of a large diameter and a solid cylindrical section of a small diameter which is provided coaxially on the distal end of the solid cylindrical section of the large diameter.

Figure 3A:
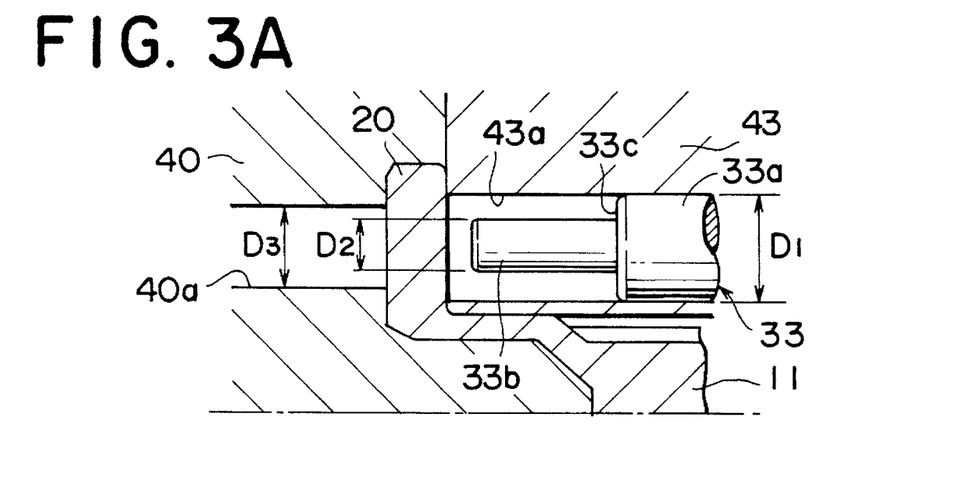
FIGS. 3A to 3C are cross-sectional views illustrative of the steps of the machining process for a planetary gear supporting pin according to a second embodiment of the present invention.
Figure 3B:
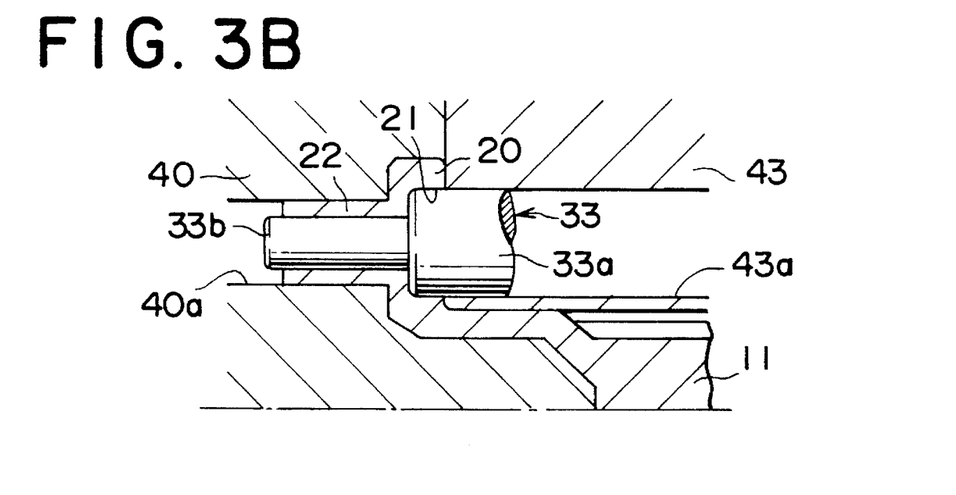
Figure 3C:
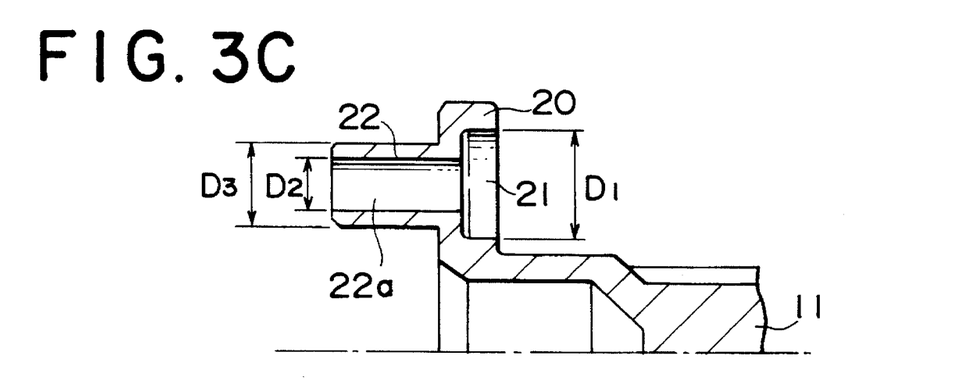

The machining process for the planetary gear supporting pins according to the second embodiment will now be described with reference to FIGS. 3A to 3C.

A punch 33 is constructed by a solid cylindrical section 33a of the large diameter D1 and a solid cylindrical section 33b of the small diameter D2 which is provided coaxially on the distal end of the solid cylindrical section 33a.

First, a material such as carbon steel and chromium/molybdenum steel is forged to form the output rotary shaft 11 and the flange section 20 into one piece.

The one-piece formed article comprised of the output rotary shaft 11 and the flange section 20 is set on the die 40 and a punch holder 43. As shown in FIG. 3A, the flange section 20 is pressurized from the front end surface toward the rear end surface thereof by using the punch 33 inserted in a hollow section 43a of the punch holder 43 which is positioned coaxially with the hole 40a of the die 40. The material pressurized by the solid cylindrical section 33b of the punch 33 is pushed out into the hole 40a of the die 40. When a stepped section 33c of the solid cylindrical section 33a comes in contact with the front end surface of the flange section 20, the material pressurized by the stepped section 33c of the solid cylindrical section 33a is extruded into the hole 40a of the die 40. Keeping on applying pressure by the punch 33 causes the distal end of the solid cylindrical section 33b to jut out of the material as illustrated in FIG. 3B. The punch 33 is then drawn out, thus forming the hollow cylindrical supporting pin 22 of the outside diameter D3 pressed out from the rear end surface of the flange section 20 as illustrated FIG. 3C. The recessed section 21 of the inside diameter D1 is formed in the front end surface of the flange section 20 so that it is coaxial with the supporting pin 22.

According to the machining process for the supporting pin in the second embodiment, as in the case of the first embodiment, the supporting pin 22 with high projection can be easily formed into the integral part of the flange section 20 while securing the perpendicularity thereof in relation to the flange section 20. Further, the number of process steps can be decreased with resultant higher productivity.

Third Embodiment:

In the first embodiment described above, the supporting pin 22 is formed by the two steps; one for pressurizing and extruding by the first punch 31 and the other for pressurizing and extruding by the second punch 32. In the third embodiment, the supporting pin 22 is formed by implementing the step for pressurizing and extruding by the second punch 32 first, then the step for pressurizing and extruding by the first punch 31.

The machining method for the planetary gear supporting pins according to the third embodiment will now be described with reference to FIGS. 4A to 4D.

Figure 4A:
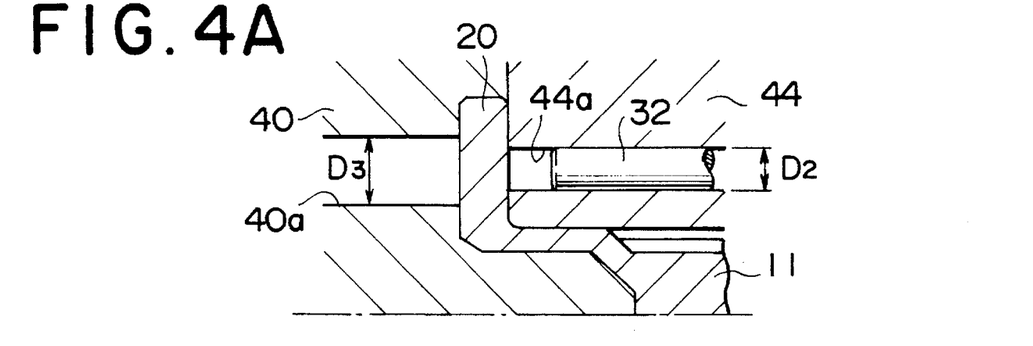
FIGS. 4A to 4D are cross-sectional views illustrative of the steps of the machining process for a planetary gear supporting pin according to a third embodiment of the present invention.

First, a material such as carbon steel and chromium/molybdenum steel is forged to form the output rotary shaft 11 and the flange section 20 into one piece.

Figure 4B:
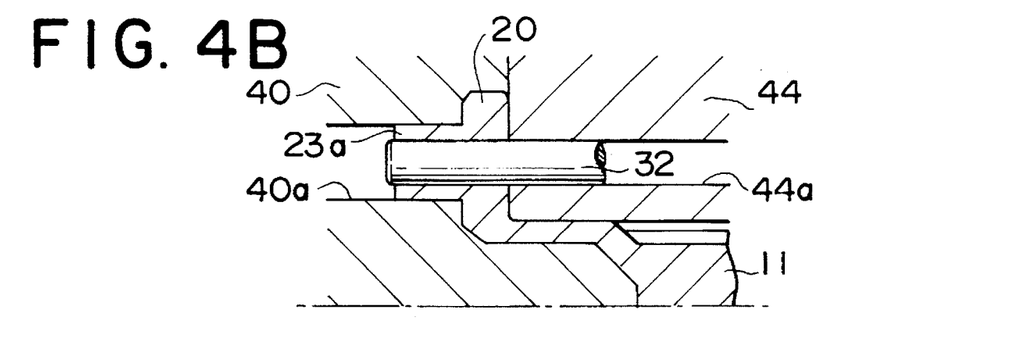

The one-piece formed article comprised of the output rotary shaft 11 and the flange section 20 is set on the die 40 and a first punch holder 44. As shown in FIG. 4A, the flange section 20 is pressurized from the front end surface toward the rear end surface thereof by using the second punch 32 inserted in a hollow section 44a of the punch holder 44 which is positioned coaxially with the hole 40a of the die 40. The material pressurized by the second punch 32 is pushed out into the hole 40a of the die 40. Keeping on applying pressure by the second punch 32 causes the distal end of the second punch 32 to jut out of the material as illustrated in FIG. 4B. The second punch 32 is drawn out to produce the hollow cylindrical section 23a from the rear end surface of the flange section 20.

Figure 4C:
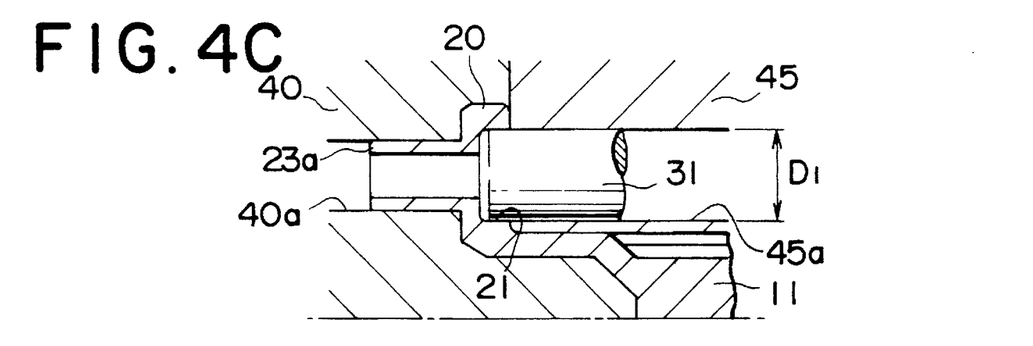
Figure 4D:
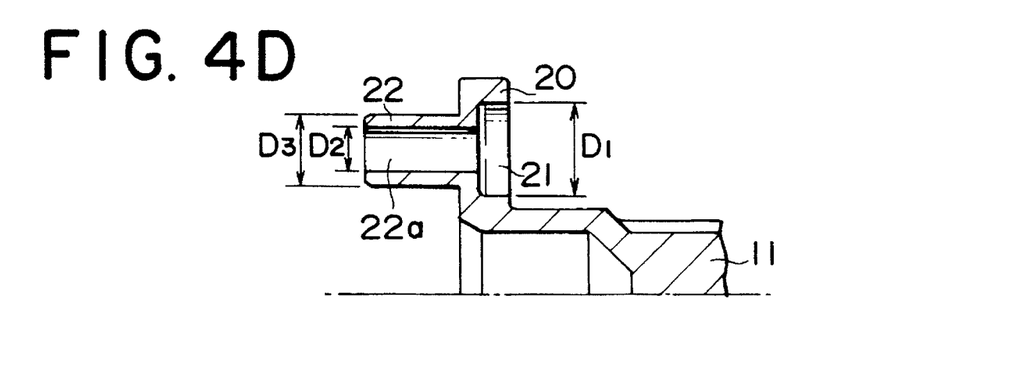

Then, the punch holder 44 is replaced by a punch holder 45; the flange section 20 is pressurized from the front end surface toward the rear end surface by the first punch 31 inserted in a hollow section 45a of the punch holder 45 which is positioned coaxially with the hole 40a of the die 40. The material pressurized by the first punch 31 is extruded into the hole 40a of the die 40, allowing the hollow cylindrical section 23a to have a high projection as illustrated in FIG. 4C. The pressurizing by the first punch 31 is continued until the projection height of the hollow cylindrical section 23a reaches a predetermined height, then the first punch 31 is drawn out. This makes the hollow cylindrical supporting pin 22 of the outside diameter D3 which is pressed out from the rear end surface of the flange section 20 as shown in FIG. 4D. The recessed section 21 of the inside diameter D1 is formed in the front end surface of the flange section 20 so that it is coaxial with the supporting pin 22.

According to the machining process for the supporting pin in the third embodiment, as in the case of the first embodiment, the supporting pin 22 with high projection can be easily formed into the integral part of the flange section 20 while securing the perpendicularity thereof in relation to the flange section 20. Further, the number of process steps can be decreased with resultant higher productivity.

In the process illustrated in FIG. 4C, the second punch 31 may be inserted in the hollow cylindrical section 23a.

Thereby, the diameter of the hollow section 23a is secured. Therefore, the supporting pin 22 is allowed to have an extra height.

Figure 5:
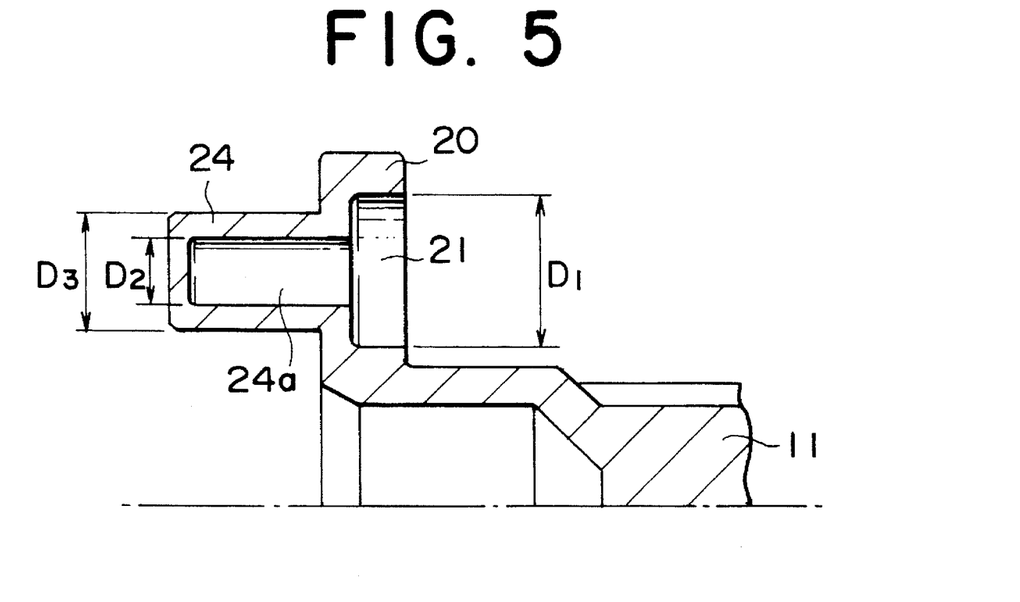
FIG. 5 is a cross-sectional view illustrative of an essential constituent member of the planetary gear speed reducer according to a fourth embodiment of the present invention.

Fourth Embodiment:

In the fourth embodiment, as shown in FIG. 5, a plurality of the recessed sections 21 of the inside diameter D1 are provided on the same circumference at equal angle pitches in the front end surface of the flange section 20 which is made integral with the output rotary shaft 11. Hollow cylindrical supporting pins 24 having the outside diameter D3 are provided on the rear end surface of the flange section 20 coaxially with the recessed sections 21. The supporting pins 24 have closed distal ends and hollow sections 24a of the inside diameter D2 are communicated with the recessed sections 21.

Thus, the fourth embodiment shares the same structure as the first embodiment stated above except that the distal ends of the supporting pins 24 are closed.

According to the fourth embodiment, therefore, the same advantages as those obtained by the first embodiment can be accomplished although the projection height of the supporting pins 24 is limited due to the closed distal ends of the supporting pins 24.

The supporting pins 24 according to the fourth embodiment can be easily formed by the machining methods for the supporting pins according to the first to third embodiments described above.

For instance, in the machining method for the supporting pin according to the first embodiment, the supporting pin 24 with the closed distal end can be formed by stopping the application of pressure by the second punch 32 before the second punch 32 juts out of the material.

Likewise, in the machining method for the supporting pin according to the second embodiment stated above, the supporting pin 24 with the closed distal end can be formed by stopping the application of pressure by the punch 33 before the distal end of the solid cylindrical section 33b of the punch 33 juts out of the material.

Further likewise, in the machining method for the supporting pin according to the third embodiment stated above, the supporting pin 24 with the closed distal end can be formed by stopping the application of pressure by the second punch 32 before the distal end of the second punch 32 juts out of the material to form the hollow cylindrical section 23a with closed distal end, then applying pressure by the first punch 31 so that the projecting height of the hollow cylindrical section 23a reaches a predetermined height.

Figure 6:
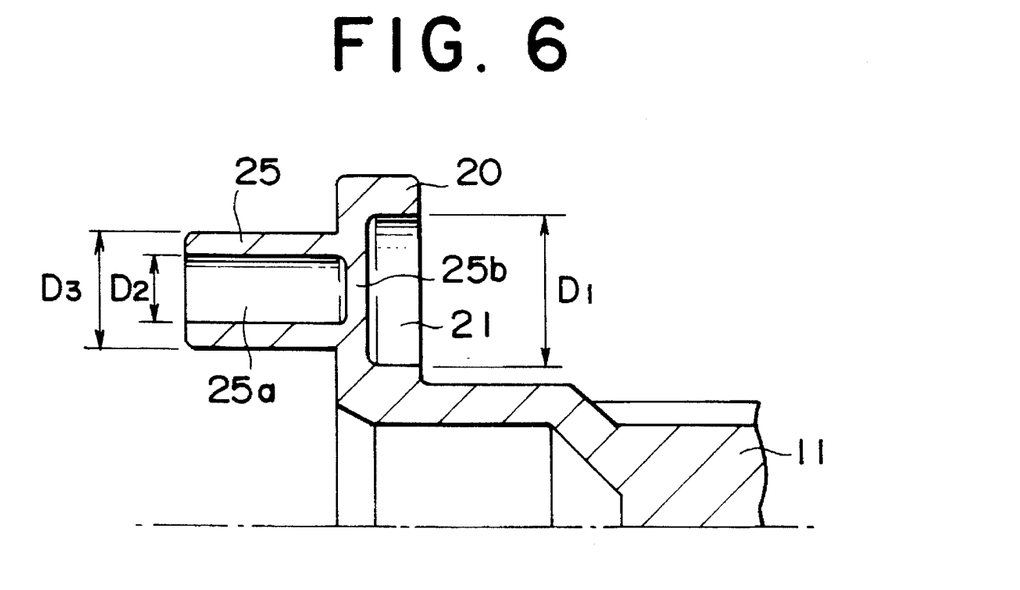
FIGS. 6 is a cross-sectional view illustrative of an essential constituent member of the planetary gear speed reducer according to a fifth embodiment of the present invention.

Fifth Embodiment:

According to the fifth embodiment, as shown in FIG. 6, a plurality of the recessed sections 21 of the inside diameter D1 are provided on the same circumference at equal angle pitches in the front end surface of the flange section 20 which is made integral with the output rotary shaft 11. Hollow cylindrical supporting pins 25 having the outside diameter D3 are provided on the rear end surface of the flange section 20 coaxially with the recessed sections 21. The supporting pins 24 have open distal ends and hollow sections 25a of the inside diameter D2 are isolated from the recessed sections 21 by partitions 25b.

Thus, the fifth embodiment shares the same structure as the first embodiment stated above except that the hollow sections 25a of supporting pins 25 are isolated from the recessed sections 21.

According to the fifth embodiment, therefore, the same advantages as those obtained by the first embodiment can be accomplished although the projection height of the supporting pin 25 is limited due to the presence of the partitions 25b.

The machining method for the planetary gear supporting pins according to the fifth embodiment will now be described with reference to FIGS. 7A to 7D.

Figure 7A:
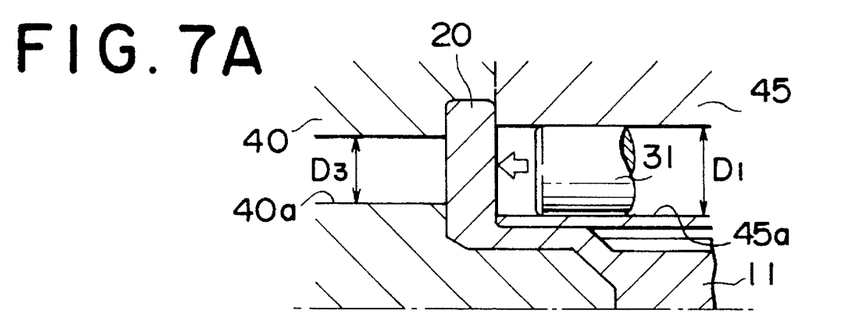
FIG. 7A to 7D are cross-sectional views illustrative of the steps of the machining process for a planetary gear supporting pin according to the fifth embodiment of the present invention.

First, a material such as carbon steel and chromium/molybdenum steel is forged to form the output rotary shaft 11 and the flange section 20 into one piece.

Figure 7B:
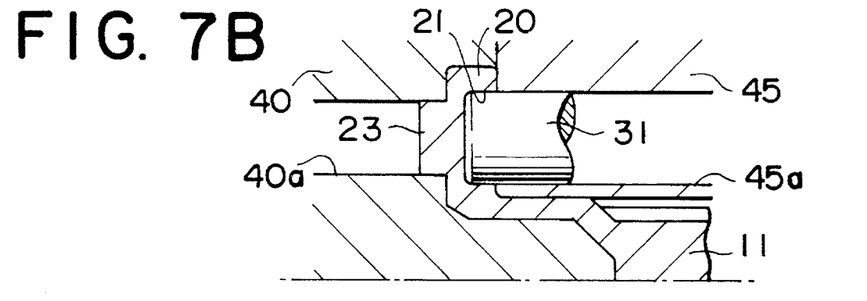

The one-piece formed article comprised of the output rotary shaft 11 and the flange section 20 is set on the die 40 and the punch holder 45. As shown in FIG. 7A, the flange section 20 is pressurized from the front end surface toward the rear end surface thereof by using the first punch 31 inserted in a hollow section 45a of the punch holder 45 which is positioned coaxially with the hole 40a of the die 40. The material pressurized by the first punch 31 is pushed out into the hole 40a of the die 40. As shown in FIG. 7B, the recessed section 21 is formed in the front end surface of the flange section 20 and the solid cylindrical section 23 is pressed out on the rear end surface of the flange section 20 coaxially with the recessed section 21.

Figure 7C:
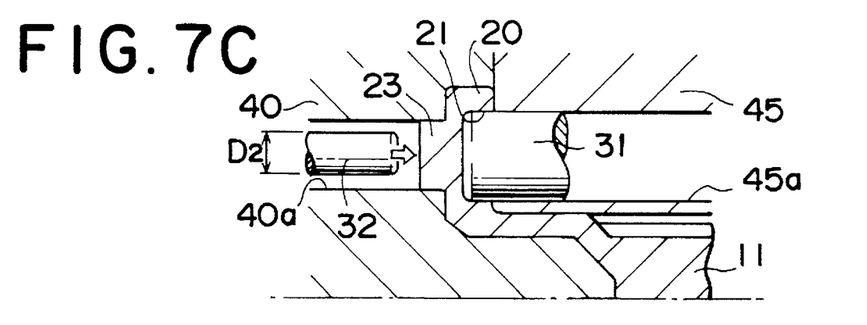
Figure 7D:
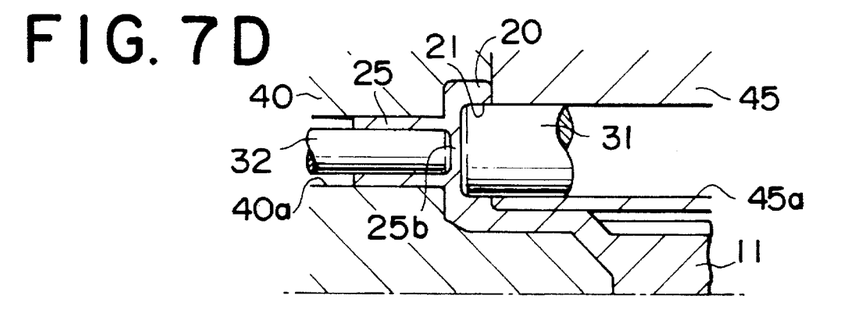

Then, as illustrated in FIG. 7C, the flange section 20 is pressurized from the rear end surface toward the front end surface by the second punch 32 which is positioned coaxially with the hole 40a of the die 40. This causes the material in the solid cylindrical section 23 pressurized by the second punch 32 to be pushed out between the hole 40a of the die 40 and the second punch 32. In the subsequent step, as shown in FIG. 7D, the application of pressure by the second punch 32 is continued until the distal end of the second punch 32 reaches a point immediately before it comes in contact with the distal end of the first punch 31, then the second punch 32 is drawn out. Thus, the hollow cylindrical supporting pin 25 is pressed out from the rear end surface of the flange section 20 as shown in FIG. 6.

According to the fifth embodiment, therefore, as in the case of the first embodiment, the supporting pin 25 with high projection can be easily formed into the integral part of the flange section 20 while securing the perpendicularity thereof in relation to the flange section 20.

The embodiments described above refer to the planetary gear speed reducer employed for the internal combustion engine starter. It is needless to say, however, that the present invention can be applied to other apparatuses which use planetary gear speed reducers.

What is claimed is:

1. A planetary gear speed reducer comprising:

an internal gear;

an output rotary shaft which has a flange section formed as an integral part thereof at the rear end and which is supported by a bearing fitted to the internal periphery of a flange of said internal gear;

a rotary shaft which is supported by a bearing fitted in a recessed section of the rear internal peripheral surface of said output rotary shaft;

a plurality of supporting pins provided on the same circumference on the rear end surface of said flange section; and a plurality of planetary gears which are rotatably mounted on said plurality of supporting pins in such a manner that they engage with said internal gear and a sun gear formed at the front end of said rotary shaft; wherein said supporting pins are pressed out in hollow cylindrical shapes at the rear end surface of said flange section, and the front end surface of said flange section is provided with recessed sections which have an inside diameter larger than the outside diameters of said supporting pins and which are coaxial with said supporting pins.

2. A planetary gear speed reducer according to claim 1, wherein the hollow sections of said supporting pins are communicated with said recessed sections and said supporting pins have open distal ends.

3. A planetary gear speed reducer according to claim 1, wherein the hollow sections of said supporting pins are communicated with said recessed sections and said supporting pins have closed distal ends.

4. A planetary gear speed reducer according to claim 1, wherein the hollow sections of said supporting pins are isolated from said recessed sections and said supporting pins have open distal ends.

* * * * *